US011888915B2

(12) United States Patent
Ramoutar et al.

(10) Patent No.: US 11,888,915 B2
(45) Date of Patent: Jan. 30, 2024

(54) E-WITNESSES PROCEDURE IN A DOCUMENT MANAGEMENT SYSTEM

(71) Applicant: DocuSign, Inc., San Francisco, CA (US)

(72) Inventors: Anthony Joseph Ramoutar, San Francisco, CA (US); David Soh, Fullerton, CA (US); Dorra Belhadj Ali, San Francisco, CA (US); Billy Travis Williams, Alameda, CA (US); Ellis David Berner, Mercer Island, CA (US); Angel Azmavet Garcia Reyes, El Paso, TX (US)

(73) Assignee: DocuSign, Inc., San Francisco, CA (US)

( * ) Notice: Subject to any disclaimer, the term of this patent is extended or adjusted under 35 U.S.C. 154(b) by 0 days.

(21) Appl. No.: 17/587,912

(22) Filed: Jan. 28, 2022

(65) Prior Publication Data
US 2023/0247075 A1   Aug. 3, 2023

(51) Int. Cl.
*H04L 65/403* (2022.01)
*H04L 65/75* (2022.01)

(52) U.S. Cl.
CPC ............ *H04L 65/75* (2022.05); *H04L 65/403* (2013.01)

(58) Field of Classification Search
CPC ....... H04L 65/60; H04L 65/403; H04N 7/147; H04N 7/15
USPC ........................................... 348/14.01–14.16
See application file for complete search history.

(56) References Cited

U.S. PATENT DOCUMENTS

| 9,634,875 | B2 | 4/2017 | Porat | |
|---|---|---|---|---|
| 10,430,570 | B2 | 10/2019 | Gonser et al. | |
| 2003/0070072 | A1* | 4/2003 | Nassiri | H04L 9/3247 713/168 |
| 2015/0381931 | A1* | 12/2015 | Uhma | G06F 3/0481 348/14.03 |
| 2018/0113845 | A1* | 4/2018 | Aggarwal | H04L 65/403 |
| 2019/0332899 | A1* | 10/2019 | Jones | H04N 7/155 |
| 2021/0266500 | A1* | 8/2021 | Taylor | G06Q 40/03 |

OTHER PUBLICATIONS

Video-based Remote Electronic Contract Signing Service System and Method KR 20230019306 A (Cho et al.; FD: Jul. 29, 2021); Date Published: Feb. 8, 2023.*
U.S. Appl. No. 17/587,930, filed Jan. 28, 2022, naming inventors Ramoutar et al.

* cited by examiner

*Primary Examiner* — Melur Ramakrishnaiah
(74) *Attorney, Agent, or Firm* — Shumaker & Sieffert, P.A.

(57) ABSTRACT

A document management system integrates with a video conference system to ensure that proper electronic witness procedure is performed for document validation. The document management system accesses a video conference between a user and an electronic witness, and then instructs the user to electronically sign the document while the electronic witness observes. The document management system receives confirmation that the electronic witness observed the video of the user electronically signing the document. The document management system combines and stores portions of the video conference that correspond to the electronic witness's validation of the document.

18 Claims, 6 Drawing Sheets

Document System Dashboard — 400

Agreement B.docx

Produced from negotiation via video conference on: 01/05/2022 — 420

Transcript — 450

Party 1: Are you willing to grant us a license for your product?

Party 2: We can grant you a two-year license but for commercial uses, please reach out to us again to obtain a commercial license.

Party 1: We will pay you an additional $100 per month if you extend the license to three years. Are you amenable to that?

Agreement Terms — 460

*Commercial Use.* If Licensee wishes to use or license the Product for Commercial Purposes, Licensee must obtain a commercial license from Licensor. Licensee acknowledges that Licensor has no obligation to grant such license to Licensee. Licensor is free to grant exclusive or non-exclusive licenses to others or assign all or part of the rights associated with the Product

[ Suggest Changes ]   [ Generate Contract ] — 470

FIG. 4B

E-WITNESSES PROCEDURE IN A DOCUMENT MANAGEMENT SYSTEM

TECHNICAL FIELD

The disclosure generally relates to the field of document management, and specifically to an integration between video conference and document management systems.

BACKGROUND

Online document management systems can be used to provide, create, and review documents and may provide users with tools to view and execute the documents. Conventional video conference systems enable users to communicate with one another remotely. After a video conference call between two users, the users must manually access the document management system and upload corresponding documents for execution. There is a need to integrate online document management and video conference systems to provide users with an improved and efficient document viewing and execution experience.

SUMMARY

To help ensure proper electronic witness ("e-witness") procedure during electronic execution of a document, a document management system integrates with a video conference system.

The document management system accesses a video conference between a signing entity and a witness entity. The video conference is established by the video conference system. The document management system provides a document, which includes an electronic signature field, to the signing entity. The document management system instructs the signing entity to electronically sign the document by including their signature within the field of the document. The document management system also instructs the witness entity to observe, within the video conference, video of the signing entity electronically signing the document. After receiving an indication that the signing entity electronically signed the document and a confirmation that the witness entity observed the signing entity electronically signing the document, the document management system combines portions of the video conference corresponding to the signing entity electronically signing the document, the witness entity observing the signing entity electronically signing the document, and confirmation from the witness entity that they observed the signing entity electronically signing the document. The document management system stores the combined portions of video in conjunction with the electronically signed document. In some embodiments, a system and/or a non-transitory computer readable storage medium performs the steps described above.

The document management system accesses and generates a transcript of the video conference between the two or more people. The document management system identifies portions of the transcript that correspond to an agreement between the two or more people and presents agreement terms to the two or more people. In response to the two or more people agreeing on the presented agreement terms, the document management system receives their electronic signatures and generates an agreement document. The agreement document includes the presented agreement terms, the received electronic signatures, and the identities of the two or more people. In some embodiments, a system and/or a non-transitory computer readable storage medium performs the steps described above.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Figure (FIG. 1 is a high-level block diagram of a system environment for a document management system, in accordance with an example embodiment.

FIG. 4B illustrates an interface of the document management system for generating an agreement from a video conference, in accordance with an example embodiment.

DETAILED DESCRIPTION

Figure 1:
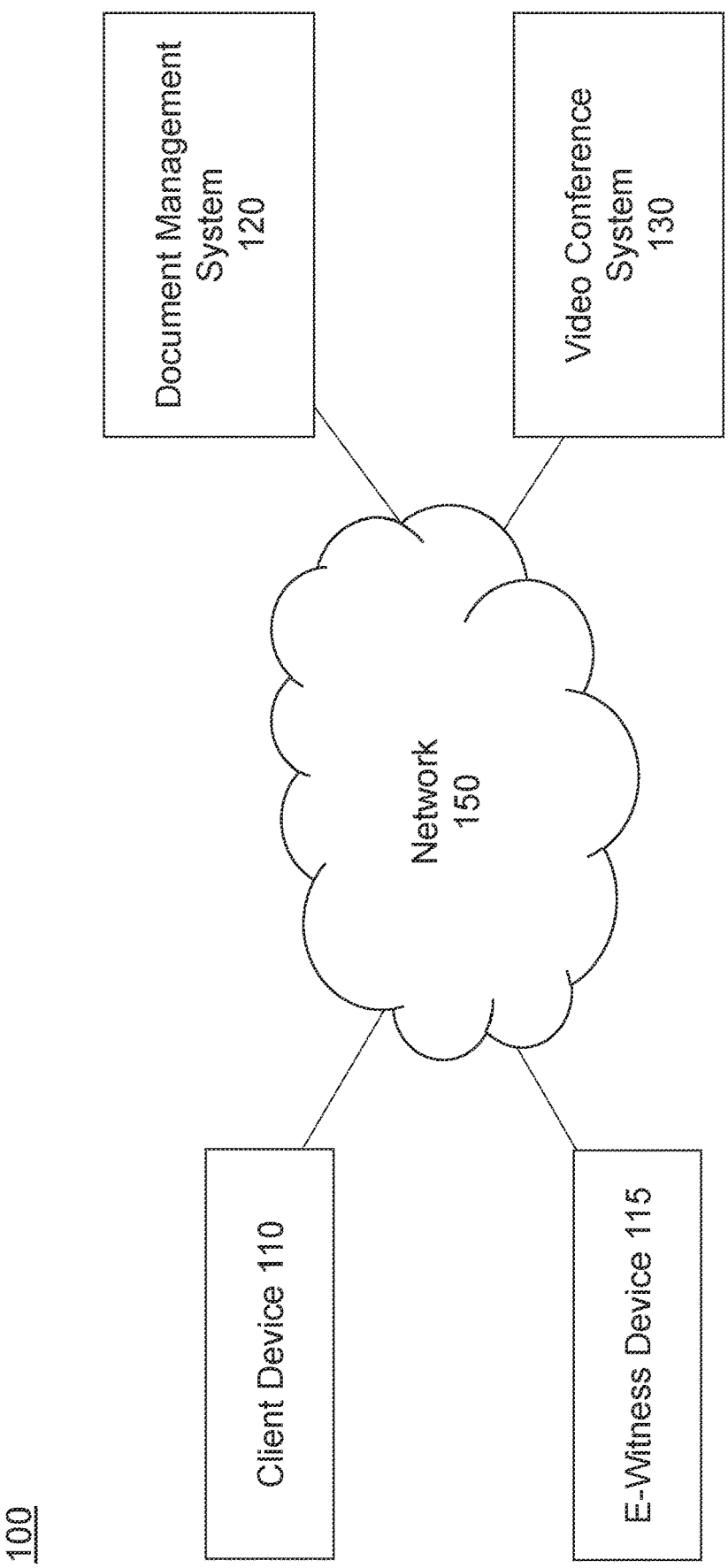

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. A letter after a reference numeral, such as "120A," indicates that the text refers specifically to the element having that particular reference numeral. A reference numeral in the text without a following letter, such as "120," refers to any or all of the elements in the figures bearing that reference numeral.

The figures depict embodiments of the disclosed system (or method) for purposes of illustration only. One skilled in the art will readily recognize from the following description that alternative embodiments of the structures and methods illustrated herein may be employed without departing from the principles described herein.

Document Management System Overview

A document management system enables a party (e.g., individuals, organizations, etc.) to create and send documents to one or more receiving parties for negotiation, collaborative editing, electronic execution (e.g., via electronic signatures), contract fulfilment, archival, analysis, and more. Within the document management system, parties may review content and/or terms presented in a digital document and in response to agreeing to the content and/or terms, the parties may electronically execute the document. In some embodiments, the parties may provide one another with feedback on the content and/or terms in the document received for execution. In some embodiments, a party completes or contributes to a portion of the content and/or terms in the document. DocuSign, Inc.'s e-Signature product is an example functionality that is implemented within a document management system. A document management system is further described in U.S. Pat. No. 9,634,875, issued Apr. 25, 2017, and U.S. Pat. No. 10,430,570, issued Oct. 1, 2019, which are hereby incorporated by reference in their entireties.

The methods described herein describe a document management system's integration with a video conference system. The document management system's integration with a video conference system facilitates proper procedure when a document needs to be validated by an electronic witness (also referred to as "e-witness procedure"). For example, the document management system may be used in electronic notarization procedures, where a notary must confirm that the appropriate signatories have signed certain documents. Additionally, when a conference (e.g., including negotiations and/or discussions between two or more users) takes place via the video conference system, the document management system can automatically detect agreement terms from the conference and generate a contract for the users' review. The integration between the document management system and video conference system provides users with a more efficient document management and execution environment.

System Environment

The system environment described herein can be implemented within an online document system, a document execution system, or any type of digital transaction management platform. It should be noted that although description may be limited in certain contexts to a particular environment, this is for the purposes of simplicity only, and in practice the principles described herein can apply more broadly to the context of any digital transaction management platform. Examples can include but are not limited to online signature systems, online document creation and management systems, collaborative document and workspace systems, online workflow management systems, multi-party communication and interaction platforms, social networking systems, marketplace and financial transaction management systems, or any suitable digital transaction management platform.

FIG. 1 is a high-level block diagram of a system environment 100 for a document management system, in accordance with an example embodiment. The system environment 100 enables client systems associated with a document management system 120 to create and manage digital documents and integrate with a video conference system 130. As illustrated in FIG. 1, the system environment 100 includes a client device 110, an e-witness device 115, a document management system 120, and a video conference system 130, each communicatively interconnected via a network 150. In some embodiments, the system environment 100 includes components other than those described herein. For clarity, although FIG. 1 only shows one client device 110 and one e-witness device 115, alternate embodiments of the system environment 100 can have any number of client devices and e-witness devices. For the purposes of concision, the web servers, data centers, and other components associated with an online system environment are not shown in FIG. 1.

A user of the client device 110 can perform actions relating to documents stored within the document management system 120. The client device 110 is a computing device capable of transmitting and/or receiving data over the network 190. The client device 120 may be, for example, a smartphone with an operating system such as ANDROID® or APPLE® IOS®, a tablet computer, laptop computer, desktop computer, or any other type of network-enabled device from which secure documents may be accessed or otherwise interacted with. In some embodiments, the client device 110 includes an application through which the user accesses the document management system 120. The application may be a stand-alone application downloaded by the client device 110 from the document management system 120. Alternatively, the application may be accessed by way of a browser installed on the client device 110 and instantiated from the document management system 120. The client device 110 enables the user to communicate with the document management system 120. For example, the client device 110 enables the user to access, review, execute, and/or analyze documents within the document management system 120 via a user interface.

The e-witness device 115 is substantially similar to the client device 110 and is operated by an electronic witness ("e-witness"). An e-witness is a person authorized to validate an action taken with regards to a document (such as the execution of the document). The authorization may be bestowed upon the e-witness by a relevant agency (e.g., a government agency) or regulation (e.g., a law requiring a witness to sign a medical consent form). In some embodiments, the e-witness is a notary. In some embodiments, the e-witness device 115 has restricted access to the document management system 120. For example, the e-witness device 115 may only be able to access and/or execute documents designated by the user of the client device 110.

The document management system 120 is a computer system (or group of computer systems) for storing and managing documents for various entities. The document management system 120 can be a server, server group or cluster (including remote servers), or another suitable computing device or system of devices. The document management system 120 can communicate with user devices (e.g., the client device 110) over the network 150. For example, the document management system 120 may provide documents for review and execution to the client device 110 and the e-witness device 115. The document management system 120 also interfaces with the video conference system 130 to enable proper e-witness procedure when the user of the client device 110 is signing a document that needs authentication. In other embodiments, the document management system 120 receives information from the video conference system 130 to generate an agreement based on a conference between two or more people occurring over the video conference system 130. Examples of documents that may be stored, analyzed, and/or managed by the document management system 120 include contracts, employment agreements, purchase agreements, services agreements, financial agreements, and so on.

The video conference system 130 is a computer system (or group of computer systems) for enabling audio and/or video conferencing between two or more users. The video conference system 130 can be a server, server group or cluster (including remote servers), or another suitable computing device or system of devices. The video conference system 130 communicates, over the network 150, with client devices (e.g., the client device 110) and presents audio and/or video feeds corresponding to the conference between the two or more users on an interface of each client device. The conference may include a user seeking validation of a document from an authorized witness entity (e.g., a notary). In other embodiments, the conference between the users is a negotiation and/or business deal. The video conference system 130 may record, with the permission of the users of each client device, the audio and/or video feeds. The video conference system 130 provides the document management system 120 with the recording of the audio and/or video feeds. In other embodiments, the video conference system 130 provides the document management system 120 with the audio and/or video feeds in real time.

The network 150 transmits data within the system environment 100. The network 150 may be a local area or wide area network using wireless or wired communication systems, such as the Internet. In some embodiments, the network 150 transmits data over a single connection (e.g., a data component of a cellular signal, or Wi-Fi, among others), or over multiple connections. The network 150 may include encryption capabilities to ensure the security of customer data. For example, encryption technologies may include secure sockets layers (SSL), transport layer security (TLS), virtual private networks (VPNs), and Internet Protocol security (IPsec), among others.

Figure 2:
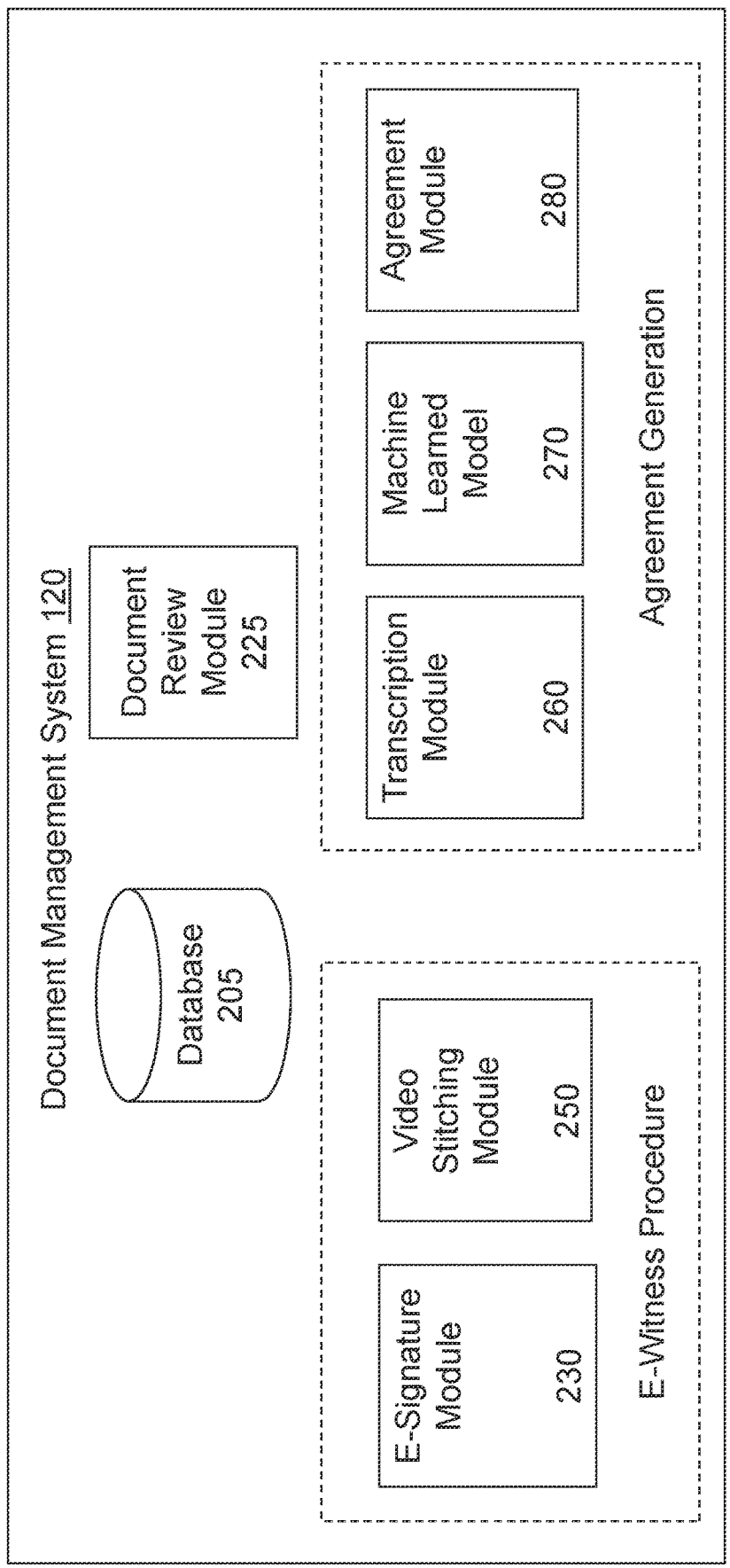
FIG. 2 is a high-level block diagram of a system architecture of the document management system, in accordance with an example embodiment.

FIG. 2 is a high-level block diagram of a system architecture of the document management system 120, in accordance with an example embodiment. The document management system 120 includes various modules and data stores to facilitate integration of the document management system 120 with the video conference system 130. The document management system 120 includes a database 205, a document review module 225, an electronic signature ("e-signature") module 230, a video stitching module 250, a transcription module 260, a machine learned model 270, and an agreement module 280. For clarity, the modules in FIG. 2 have been grouped according to system processes that they support. The electronic signature module 230 and the video stitching module 250 are used by the document management system 120 to ensure proper e-witness procedure. The transcription module 260, the machine learned model 270, and the agreement module 280 are used by the document management system 120 to generate agreements.

Computer components such as web servers, network interfaces, security functions, load balancers, failover servers, management and network operations consoles, and the like may not be shown so as to not obscure the details of the system architecture. The document management system 120 may contain more, fewer, or different components than those shown in FIG. 2 and the functionality of the components as described herein may be distributed differently from the description herein.

The database 205 stores information relevant to the document management system 120. The stored data may include, but is not limited to, documents for analysis and/or execution, client device identifiers (e.g., of the client device 110 and e-witness device 115), audio and/or video feeds from the video conference system 130, video conference transcripts, generated machine learned models, agreements, and so on. In some embodiments, the database 205 stores metadata information associated with documents or clauses, such as documents labeled with training data for machine learning models. The document management system 120 can update information stored in database 205 as new information is received, such as new documents and conference recordings and transcripts, results of analyses performed by the document review module 225, and feedback from users of the document management system 120. The document management system 120 can also update information stored in the database 205 based on user input provided via user interfaces that may be generated by the document review module 225. Updates to machine learned models are also stored in the document management system 120.

The document review module 225 facilitates human review of documents stored in the document management system 120. In various embodiments, the document review module 225 provides one or more user interfaces to client systems associated with the document management system 120 for reviewing documents and analysis of documents. For example, the document review module 225 may transmit user interfaces for rendering by the client device 110 to present a document or information about documents to the user of the client device 110. Document information presented in the user interfaces may include document metadata, information about conferences that occurred via the video conference system 130, users involved in the conference, agreement terms determined from the negotiations, and so on.

E-Witness Procedure

The e-signature module 230 manages electronic signatures on documents within the document management system 120. The e-signature module 230 helps ensure proper e-witness procedure when the signing entity seeks to validate the execution of a document by an e-witness. The document management system 120 presents a document with a field for an electronic signature for a user to sign (referred to as "the signing entity"). The e-signature module 230 instructs the signing entity to electronically sign the document within the electronic signature field. The e-signature module 230 also instructs the e-witness to observe a video feed (e.g., presented via the video conference system 130) of the signing entity executing the document. The instructions may be displayed on a user interface of the signing entity's client device (e.g., the client device 110) and on a user interface of the e-witness's client device (e.g., the e-witness device 115). In some embodiments, the e-signature module 230 also checks and/or receives confirmation that the signing entity has signed the document. For example, the e-signature module 230 may check that the electronic signature field has been filled and/or dated. The e-signature module 230 checks and/or receives confirmation that the e-witness has observed the video of the signing entity executing the document. This confirmation occurs when the e-witness interacts with a user interface of the document management system 120 and/or the video conference system 130. For example, the e-witness may select a button, electronically initial the document, and/or electronically sign the document. In some embodiments, the e-witness may verbally confirm that they observed the signing of the document, wherein the verbal confirmation is captured by the video conference system 130.

The video stitching module 250 facilitates the integration of the video conference system 130 with the document management system 120. The video stitching module 250 receives from the video conference system 130 a video of the conference between the signing entity and e-witness. The received video conference may include a corresponding audio feed. The received video conference includes the signing entity being instructed to electronically sign the document, the signing entity electronically signing the document, the e-witness being instructed to observe the signing entity electronically signing the document, the e-witness observing the signing entity electronically signing the document, and the e-witness's confirmation. The video stitching module 250 combines a subset or all of these portions of the video conference. The document management system 120 then stores the combined portions of the video conference in conjunction with the electronically signed document. In some embodiments, the document management system 120 stores the combined portions of the video conference with transcripts of the video conference, generated by the transcription module 260.

The video stitching module 250 may also obscure and/or delete personally identifiable information (PII) from the video conference. The video stitching module 250 determines, by user input and/or image processing, that the received video has PII relating to the users in the conference. The video stitching module 250 subsequently obscures (e.g., by blurring or blacking out) the PII. Examples of PII include social security numbers, driver's license numbers, financial account numbers, credit card numbers, birthdays, residential addresses, and so on.

The video stitching module 250 ensures that the received video conference is of sufficient quality to ensure proper e-witness procedure. The video stitching module 250 determines video quality metrics (e.g., video bandwidth and/or resolution). If the video quality metrics are below a witness threshold criteria, indicating that the video was not clearly visible, for example, the video stitching module 250 may prevent the e-witness from confirming that they observed the video of the signing entity electronically signing the document. The document management system 120 may provide the signing entity with a new copy of the document, after which the video stitching module 250 reinitiates the electronic signing process via the e-signature module 230. The witness threshold criteria (e.g., a minimum video bandwidth and/or or video resolution) may be input manually by one or more users, may vary by jurisdiction, and/or may be set by the document management system 120.

Agreement Generation

The transcription module 260 generates transcripts of the received video conference between users. The transcription module 260 may use transcription software, which relies on speech recognition, to automatically generate a transcript of the video conference. The transcript includes text representative of speech by the users in the video conference. In some embodiments, the transcription module 260 adjusts the transcript based on user input. For an e-witness procedure, the transcription module 260 may provide the transcript to the video stitching module 250, which then stores the transcript along with the combined portions of the video.

The machine learned model 270 is configured to identify an offer and agreement terms from video conference transcripts. For example, the two users may negotiate a business deal via the video conference system 130. The transcription module 260 transcribes the users' conversation. The machine learned model 270 then determines terms of the agreement from the transcript. The machine learned model 270 is trained on a training set of information which includes a number of conference transcripts, with agreements, offers, and terms tagged within the conference transcripts. The machine learned model 270, when applied to a conference transcript, is configured to identify agreements, offers, and terms within the conference transcript, for instance based on relationships identified between the tagged portions of the conference transcript. After being trained, the machine learned model 270 is applied to the transcript generated by the transcription module 260. The machine learned model 270 determines and outputs agreement terms from the conference accordingly. The agreement terms may be presented to the users for accuracy and revision. Any feedback from users is added to the training set to retrain the machine learned model 270. The training and application of the machine learned model 270 is further discussed with respect to FIG. 3.

The agreement module 280 presents the agreement terms output by the machine learned model 270 to the users. The agreement module 280 may instruct the users to electronically sign a document with the presented agreement terms. If a user disagrees with one or more agreement terms, the user may submit revisions. The agreement module 280 then incorporates the changes and generates a new set of agreement terms for the users' review and signatures. The agreement module 280 may also present portions of the video conference corresponding to the users' negotiation of the agreement terms. In some embodiments, the agreement module 280 provides the agreement terms to the e-signature module 230, which then instructs the users to electronically sign the document. After receiving confirmation of the agreement terms from the users, the agreement module 280 generates an agreement document that includes the agreement terms. The agreement document also identifies the users involved in the conference and includes their electronic signatures. The agreement module 280 provides the agreement document to the document review module 225 for the users' final review. The generated agreement document may be encrypted and/or only accessible to the users involved in the video conference. In some embodiments, the users may grant others access to the agreement document and/or portions of the video conference corresponding to the negotiation.

Figure 3:
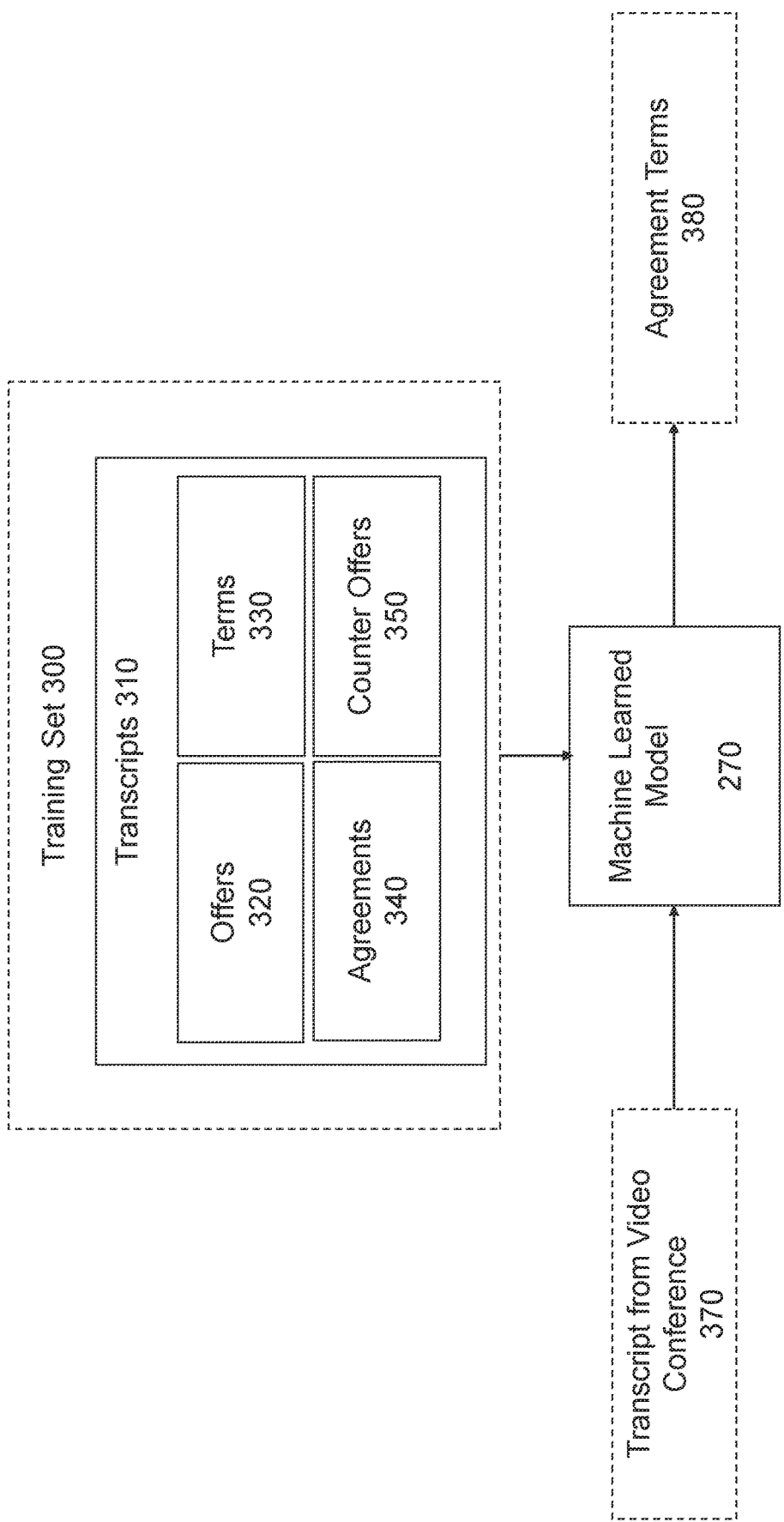
FIG. 3 is a flow diagram illustrating training and application of a machine learned model configured to identify agreement terms from a transcript, in accordance with an example embodiment.

FIG. 3 is a flow diagram illustrating training and application of the machine learned model 270 configured to identify agreement terms from a transcript, in accordance with an example embodiment. As described with respect to FIG. 2, the machine learned model 270 takes in a conference transcript and outputs agreement terms. More specifically, the machine learned model 270 can determined agreed upon terms as well as proposed changes to agreement terms.

The document management system 120 trains the machine learned model 270 using a training set of information 300. The training set 300 includes transcripts 310 of conferences between two or more people. The conferences are negotiations and/or discussions that are each associated with offers 320 and specific terms 330, which are either agreed upon—agreements 340—or countered with counter offers 350. Portions of each transcript 310 are associated with an offer 320, terms 330, agreements 340, and/or counter offers 350. For example, the training set may include a transcript 310 of an employment contract negotiation between an employer and future employee. A portion of the transcript 310 includes an offer 320 presented by the employer to the future employee, with specific terms 330, such as salary, location, and benefits. The employee may agree 340 to a subset of the terms 330, such as location and benefits, but propose changes to the salary, i.e., a counter offer 350. The training set 300 includes portions of the transcript 310 that correspond to each of these stages of the negotiation.

The information in the training set 300 may be representative of transcripts of historical conferences from the video conference system 130 that have been provided to the document management system 120. The training set 300 also may include metadata associated with each transcript 310, such as the type of agreement (e.g., purchase agreement, employment agreement, etc.), duration and/or date of the conference, geographic region in which the conference took place, and so on. In some embodiments, users of the document management system 120 and/or users involved in the conference provide input to the training set 300 as to portions of the transcripts 310 that correspond to offers 320, terms 330, agreements 340, and/or counter offers 350.

The document management system 120 trains the machine learned model 270 with the training set 300 using supervised or unsupervised machine learning. Different machine learning techniques may be used in various embodiments, such as linear support vector machines (linear SVM), boosting for other algorithms (e.g., AdaBoost), neural networks, logistic regression, naïve Bayes, memory based learning, random forests, bagged trees, decision trees, boosted trees, boosted stumps, and so on.

After training, the machine learned model 270 can identify portions of a conference transcript that correspond to offers, terms, agreements, and counter offers. Accordingly, when applied to a transcript from a video conference 370, the machine learned model 270 outputs agreement terms 380 along with a confidence score. The confidence score characterizes the accuracy with which the machine learned model 270 identified the agreement terms 380.

The document management system 120 presents agreement terms 380 that have confidence levels above a threshold to the users involved in the conference. The users may confirm the accuracy of the agreement terms 380 via a user interface of the document management system 120 and/or the video conference system 130. In some embodiments, the document management system 120 presents agreement terms 380 associated with below threshold confidence levels to users for feedback, which is subsequently input into the training set 300 and used when retraining the machine learned model 270.

Example Interface for E-Witness Procedure

Figure 4A:
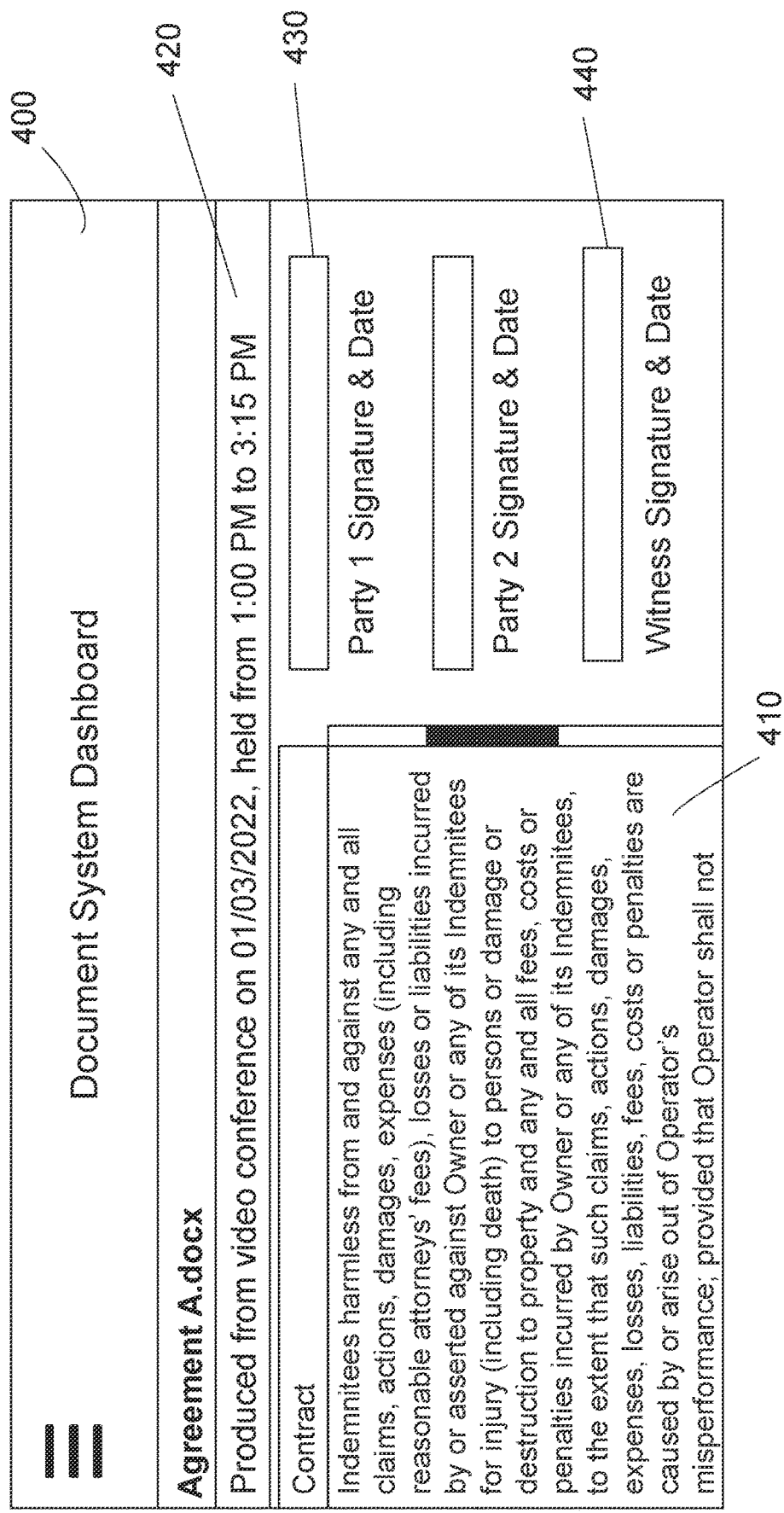
FIG. 4A illustrates an interface of the document management system for ensuring proper electronic witness ("e-witness") procedure, in accordance with an example embodiment.

FIG. 4A illustrates an interface 400 of the document management system 120 for ensuring proper electronic witness ("e-witness") procedures, in accordance with an example embodiment. In the embodiment shown, the interface 400 displays a document 410, information 420 about a video conference, electronic signature fields 430 for users, and an e-witness signature field 440. The interface 400 may be displayed on users' client devices (e.g., the client device 110 and the e-witness device 115) in conjunction with a live video feed from the video conference system 130. In other embodiments, the interface 400 may be displayed in conjunction with a recording of the video feed. In the video conference, users may discuss and/or validate the document 410. The interface 400 includes information 420 about this video conference, such as date and time. In some embodiments, the interface 400 displays additional information about the video conference, such as video quality metrics. The users in the video conference may electronically sign the document via the electronic signature fields 430. If the document needs validation, the e-witness may sign via the e-witness signature field 440 and may confirm, via an interface element, that the e-witness observed the signing of the document by the users in the video conference.

Example Interface for Agreement Generation

FIG. 4B illustrates the interface 400 of the document management system 120 for generating an agreement from a video conference, in accordance with an example embodiment. In the embodiment shown, the interface 400 includes information 420 about the video conference, a transcript 450 of the video conference, generated agreement terms 460, and feedback elements 470. As described with respect to FIG. 4A, two or more users may discuss and/or negotiate a deal over a video conference hosted by the video conference system 130. The interface 400 presents the information 420 and the transcript 450 corresponding to the video conference. The transcript 450 distinguishes between users in the video conference (e.g., Party 1 and Party 2). The interface 400 also presents the agreement terms 460 generated by the document management system 120. Through feedback elements 470, the users may either suggest changes to the agreement terms 460 or confirm the agreement terms 460 to generate a contract. Once the agreement terms 460 are finalized, the interface 400 displays electronic signature fields within which the users can sign, such as those shown in FIG. 4A.

Process for E-Witness Procedure

Figure 5B:
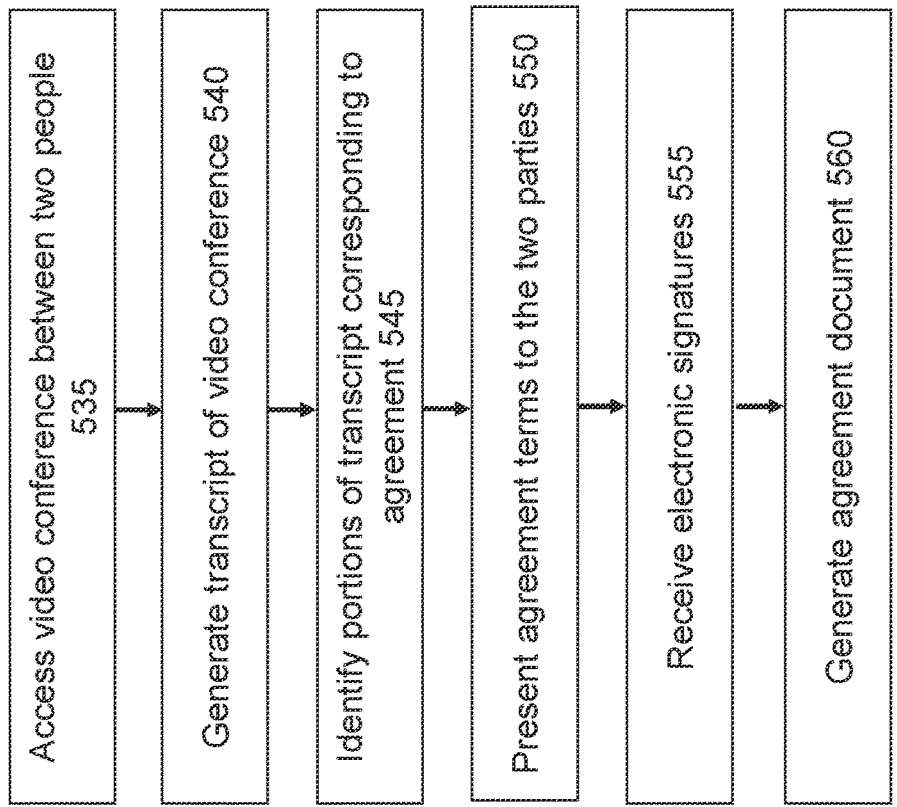
FIG. 5B illustrates an example process for generating an agreement from a video conference, in accordance with an example embodiment.
Figure 5A:
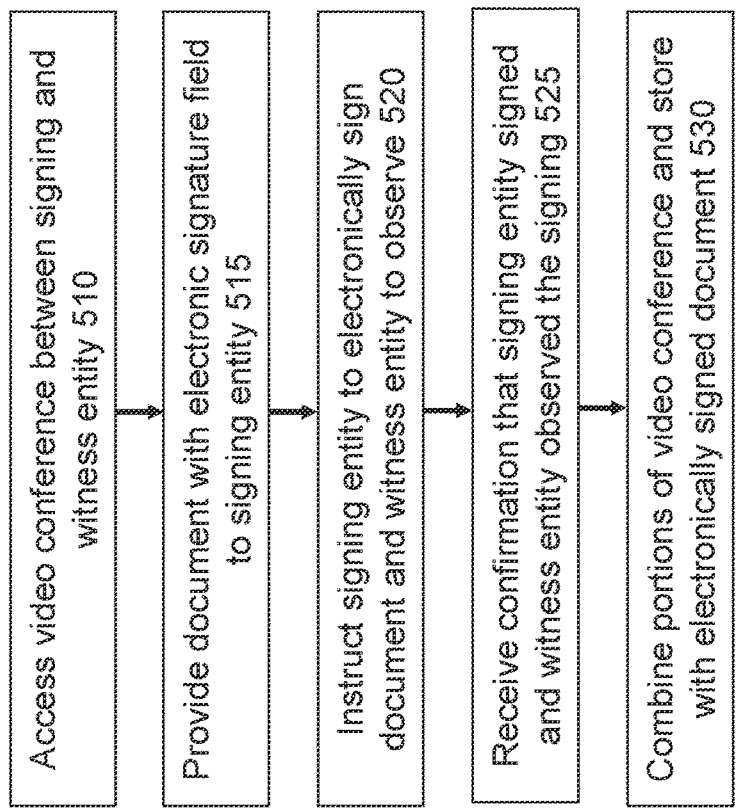
FIG. 5A illustrates an example process for ensuring proper e-witness procedure, in accordance with an example embodiment.

FIG. 5A illustrates an example process for ensuring proper e-witness procedure, in accordance with an example embodiment. A central document system (e.g., the document management system 120) accesses 510 a video conference between a signing entity and a witness entity. The video conference is hosted on a central video system (e.g., the video conference system 130). The central document system provides 515 a document with an electronic signature field to the signing entity. The central document system instructs 520 the signing entity to electronically sign the document (i.e., by placing an electronic signature within the electronic signature field) and the witness entity to observe video of the signing entity electronically signing the document. The central document system receives 525 an indication that the signing entity has electronically signed the document as well as a confirmation that the witness entity observed the video of the signing entity electronically signing the document. The central document system combines 530 portions of the video conference that show the signing entity electronically signing the document, the witness entity observing the document being electronically signed, and the witness entity confirming that they observed the document being electronically signed. The combined portions of the video are stored along with the electronically signed document.

Process for Agreement Generation

FIG. 5B illustrates an example process for generating an agreement from a video conference, in accordance with an example embodiment. The central document system accesses 535 a video conference between two or more people and generates 540 a transcript of the video conference. The transcript includes text representative of speech from the two or more people. The central document system uses a machine learned model (e.g., the machine learned model 270) to identify 545 portions of the transcript corresponding to an agreement between the two or more people. The central document system presents 550 agreement terms identified from portions of the transcript to the two or more people. When the two or more people agree to the presented agreement terms, the central document system receives 555 their electronic signatures. The central document system finally generates 560 an agreement document with the presented agreement terms, identities of the two or more people, and their electronic signatures.

Additional Configuration Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like.

Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
accessing, by a system, a video conference between at least a signing entity and a witness entity;
providing, by the system, a document to the signing entity, the document including a field for an electronic signature from the signing entity;
instructing, by the system, the signing entity to electronically sign the document by including a signature within the field of the document;
instructing, by the system, the witness entity to observe video of the signing entity electronically signing the document within the video conference;
receiving, by the system, an indication that the signing entity has electronically signed the document;
determining, by the system, one or more video quality metrics of the video conference;
receiving, by the system, based on determining that the one or more video quality metrics of the video conference satisfy a witness threshold criteria, a confirmation from the witness entity that the witness entity observed the video of the signing entity electronically signing the document;
combining, by the system, portions from the video conference that include one or more of the video of the signing entity electronically signing the document, video of the witness entity observing the document being electronically signed by the signing entity, or video of the witness entity confirming that the witness entity observed the video of the signing entity electronically signing the document;
storing, by the system, the combined portions from the video conference in conjunction with the electronically signed document;
and
based on determining that the one or more video quality metrics of the video conference fail to satisfy the witness threshold criteria, preventing, by the system, the witness entity from confirming that the witness entity observed the video of the signing entity electronically signing the document.

2. The method of claim 1, wherein the combined portions from the video conference further comprise one or more of video of the signing entity being instructed to electronically sign the document or video of the witness entity being instructed to observe the video of the signing entity electronically signing the document.

3. The method of claim 1, wherein the received confirmation that the witness entity observed the video of the signing entity electronically signing the document comprises one or more of: the witness entity selecting a button, the witness entity electronically initialing the document, or the witness entity electronically signing the document.

4. The method of claim 3, wherein the received confirmation is generated in response to an interaction by the witness entity within an interface of the system or an interface of a central video system configured to establish the video conference between at least the signing entity and the witness entity.

5. The method of claim 1, wherein the document comprises one or more of: a contract, an employment agreement, a purchase agreement, a services agreement, or a financial agreement.

6. The method of claim 1, further comprising obscuring, by the system, personally identifiable information in the video conference.

7. The method of claim 1, wherein the one or more video quality metrics include one or more of a video bandwidth or a video resolution.

8. The method of claim 1, wherein the witness entity is a notary.

9. The method of claim 1, further comprising:
generating, by the system, a transcript of the video conference; and
combining, by the system, the transcript with the combined portions from the video conference.

10. Non-transitory computer-readable storage media storing executable instructions that, when executed by a hardware processor, cause the hardware processor to:
- access a video conference between at least a signing entity and a witness entity;
- provide a document to the signing entity, the document including a field for an electronic signature from the signing entity;
- instruct the signing entity to electronically sign the document by including a signature within the field of the document;
- instruct the witness entity to observe video of the signing entity electronically signing the document within the video conference;
- receive an indication that the signing entity has electronically signed the document;
  - determine one or more video quality metrics of the video conference;
- receive, based on a determination that the one or more video quality metrics of the video conference satisfy a witness threshold criteria, a confirmation from the witness entity that the witness entity observed the video of the signing entity electronically signing the document;
- combine portions from the video conference that include one or more of the video of the signing entity electronically signing the document, video of the witness entity observing the document being electronically signed by the signing entity, and video of the witness entity confirming that the witness entity observed the video of the signing entity electronically signing the document;
- store the combined portions from the video conference in conjunction with the electronically signed document; and
- based on a determination that the one or more video quality metrics of the video conference fail to satisfy the witness threshold criteria, prevent the witness entity from confirming that the witness entity observed the video of the signing entity electronically signing the document.

11. The non-transitory computer-readable storage media of claim 10, wherein the combined portions from the video conference further comprise one or more of video of the signing entity being instructed to electronically sign the document or video of the witness entity being instructed to observe the video of the signing entity electronically signing the document.

12. The non-transitory computer-readable storage media of claim 10, wherein the received confirmation that the witness entity observed the video of the signing entity electronically signing the document comprises one or more of: the witness entity selecting a button, the witness entity electronically initialing the document, or the witness entity electronically signing the document.

13. The non-transitory computer-readable storage media of claim 12, wherein the received confirmation is generated in response to an interaction by the witness entity within an interface executed by the hardware processor or an interface of a central video system configured to establish the video conference between at least the signing entity and the witness entity.

14. The non-transitory computer-readable storage media of claim 10, wherein the document comprises one or more of: a contract, an employment agreement, a purchase agreement, a services agreement, or a financial agreement.

15. The non-transitory computer-readable storage media of claim 10, wherein the instructions further cause the hardware processor to obscure personally identifiable information in the video conference.

16. The non-transitory computer-readable storage media of claim 10, wherein the one or more video quality metrics include one or more of a video bandwidth or a video resolution.

17. The non-transitory computer-readable storage media of claim 10, wherein the witness entity is a notary.

18. A document management system comprising:
- one or more hardware processors; and
- non-transitory computer-readable storage media storing executable instructions that, when executed, cause the one or more hardware processors to:
  - access a video conference between at least a signing entity and a witness entity;
  - provide a document to the signing entity, the document including a field for an electronic signature from the signing entity;
  - instruct the signing entity to electronically sign the document by including a signature within the field of the document;
  - instruct the witness entity to observe video of the signing entity electronically signing the document within the video conference;
  - receive an indication that the signing entity has electronically signed the document;
  - determine one or more video quality metrics of the video conference;
  - receive, based on a determination that the one or more video quality metrics of the video conference satisfy a witness threshold criteria, a confirmation from the witness entity that the witness entity observed the video of the signing entity electronically signing the document;
  - combine portions from the video conference that include one or more of the video of the signing entity electronically signing the document, video of the witness entity observing the document being electronically signed by the signing entity, or video of the witness entity confirming that the witness entity observed the video of the signing entity electronically signing the document;
  - store the combined portions from the video conference in conjunction with the electronically signed document; and
  - based on a determination that the one or more video quality metrics fail to satisfy the witness threshold criteria, prevent the witness entity from confirming that the witness entity observed the video of the signing entity electronically signing the document.

* * * * *